Patented Aug. 24, 1948

2,447,762

UNITED STATES PATENT OFFICE 2,447,762

ORGANIC CATION EXCHANGE ADSORBENTS PREPARED FROM SPENT ALKYLATION SULFURIC ACID OR SIMILAR MATERIAL

Stephen J. Macuga, Lansdowne, Frank G. Ciapetta, Drexel Hill, and Randall G. Heiligmann, Yeadon, Pa., assignors to The Atlantic Refining Company, Philadelphia, Pa., a corporation of Pennsylvania No Drawing. Application October 20, 1943, Serial No. 507,226

8 Claims. (Cl. 260—94)

This invention relates to organic cation exchange adsorbents and to a practical and economical method for preparing such adsorbents from materials which are both cheap and readily available.

An object of the invention is to prepare cation exchange adsorbents from spent alkylation acid and to provide a method which is applicable also to the preparation of cation exchange adsorbents from sulfuric acid which has been employed as catalyst in the polymerization of olefins.

Another object is to utilize normally gaseous olefins in the preparation of cation exchange adsorbents.

A further object is to provide cation exchange adsorbents which are adapted for use as water softening and purifying agents, and which, when used for this purpose, do not lend color to the effluent water.

A still further object of the invention is to provide cation exchange adsorbents which do not promote the growth of molds when used in water treatment operations, and which are easily and cheaply regenerated.

Other and more specific objects of the invention will be apparent from the following description and claims.

It has been heretofore proposed to prepare cation exchange adsorbents from the separable sludge which develops when petroleum oils are treated with concentrated or fuming sulfuric acid to remove undesirable constituents. We have tested these products and have found that although they are capable of cation exchange, they exhibit physical properties which preclude their commercial application. For example, when tested as water softening agents, the treated water was invariably highly colored, the coloring apparently deriving from low molecular weight water-soluble sulfonic compounds leached out of the adsorbent. This color-throwing propensity on the part of adsorbents prepared from petroleum acid sludge appears inherent, and we know of no means of preventing it. Contrary to the patent literature, heating the sludge in the presence of an excess of sulfuric acid, while offering some improvement, does not appear to eliminate the presence of bodies which are either soluble or peptizable in water. The results of our experiments with cation exchangers produced from petroleum acid sludge are confirmed by the observations made by Burrell, Ind., and Eng. Chem., vol. 30, page 358 (1938).

The cation exchange adsorbents of the present invention are well adapted for commercial use, comparing favorably with exchange adsorbents prepared from sulfonated coal and those of the synthetic resin type, e. g., the tannin or phenol-formaldehyde resins. They are essentially free of bodies soluble or peptizable in water, and are further characterized by their high exchange capacity and velocity, and by their excellent stability, both mechanical and chemical, towards acids, alkalies, and heat.

Our cation exchange adsorbents are prepared by heating an acid liquor comprising sulfuric acid and a polymer of a normally gaseous olefin at a temperature and for a period of time sufficient to convert the acid liquor to a granular solid. The acid liquor, which may contain other polymerization products of the olefin in addition to simple polymers, may be expressly prepared for the purpose of the heat treatment, or it may constitute a waste or byproduct.

By the term "normally gaseous olefin" as used herein, we, of course, mean olefins which cannot be liquefied at ordinary atmospheric temperature and pressure, viz., ethylene, propylene, and the butylenes. The olefin polymer present in the acid liquor may be either a homopolymer or a copolymer of any two or more of these gaseous hydrocarbons.

According to the preferred embodiment of the invention, the material subjected to the heat treatment is spent alkylation acid, that is, sulfuric acid which has been employed as catalyst in the alkylation of saturated hydrocarbons, such as straight or branched chain paraffin hydrocarbons or of aromatic hydrocarbons with normally gaseous olefins. We especially prefer sulfuric acid which has been employed in the alkylation of isobutane with butylene. This reaction is usually carried out at a temperature of from 20° F. to 60° F. and under a pressure slightly in excess of that required to maintain the reactants in a liquid state, using a weight ratio of olefin to isoparaffin of from 1:4 to 1:10, and sulfuric acid of a concentration of about 98%. The hydrocarbon in the spent acid which is of higher molecular weight than either of the reactants or the product of the alkylation reaction is, of course, accounted for by the olefin since neither the other reactant, i. e., the iso-paraffin, nor the product octane is polymerizable.

Sulfuric acid which has been employed as catalyst in the homopolymerization of isobutylene or in the copolymerization of isobutylene with normal butylene may also be used in the practice of the invention. The copolymerization of isobutylene and normal butylene to yield isomers of octylene, which are valuable for use in the production of motor fuels of high octane rating, is usually conducted by contacting the mixed olefins with sulfuric acid of a strength ranging from 60% to 75% at a temperature of about 200° F., and, as in the instance of the above alkylation reaction, under a pressure which is at least equivalent to the vapor pressure of the reactants at the operating temperature. Similar reaction conditions are observed when isobutylene is polymerized in the absence of normal butylene.

The hydrocarbon content of spent acids treated according to the invention may vary over a wide range, but we prefer to treat spent acids which contain a minimum of 10% hydrocarbon and in which the acid concentration on a hydrocarbon-free basis is about 98%. When indicated, the acid concentration may be increased through the addition of fuming sulfuric acid.

Where it is necessary or desirable to expressly prepare the acid liquor, this may be accomplished by the simple expedient of intimately mixing one or a plurality of normally gaseous olefins and sulfuric acid (98%) at ordinary room temperature. The mixing operation may be carried out in the presence or absence of paraffin hydrocarbons. For best results, a weight ratio of acid to olefin of at least 3:1 should be employed.

The hereinbefore mentioned heat treatment leading to the production of our exchange adsorbents is carried out in substantially the same manner irrespective of whether the acid liquor has been expressly prepared or constitutes a waste or byproduct. Temperatures within the range of from 250° F. to 350° F., are usually employed to effect the desired solidification but sulfonation may begin at a considerably lower temperature. The transformation from liquid to granular solid, which is accompanied by the elimination of copious amounts of $SO_2$, proceeds through the intermediate formation of a gel. In order to carry the reaction to substantial completion, it is advisable to continue the heating for an additional period subsequent to the granulation and hardening of the gel, the use of temperatures in excess of 350° F. being avoided since a certain amount of coking invariably takes place at such temperatures resulting in a product which is decidedly infirm.

Although we usually carry out the heat treatment at ordinary atmospheric pressure, either superatmospheric or subatmospheric pressures may be used if desired. A superior product may often be realized by utilizing catalysts which promote sulfonation such as HF, $HgSO_4$, $Na_2SO_4$, and $NaHSO_4$.

Following the period of additional heating, which is usually of from 1 to 4 hours in duration, the product is first washed free of excess acid and then dried. The dried product consists of hard, black, lustrous grains capable of exchanging hydrogen ions for various cations in aqueous solutions. After its use in an exchange reaction, it may be easily regenerated by treatment with a dilute mineral acid, such as 2% HCl or $H_2SO_4$. Where it is desired to produce an adsorbent suitable for use in the sodium cycle, the mass after it has been washed free of excess acid, is neutralized, as with aqueous sodium bicarbonate, prior to being dried. The regeneration of adsorbent which has been used on the sodium cycle may be easily effected, for example, by treatment with a 5% solution of NaCl.

Although our cation exchange adsorbents doubtless possess other function or exchange groups, such as COOH (COONa), and OH (ONa), we believe that their activity is due primarily to the presence of the $SO_3H$ ($SO_3Na$) group. Since the hydrocarbon residue to which the $SO_3H$ or $SO_3Na$ group is attached obviously comprises one or more polymers of the normally gaseous olefin or olefins used in the preparation of the material subjected to the heat treatment, our adsorbents are definable as comprising a high molecular weight sulfuric acid derivative of a polymer of a normally gaseous olefin, the derivative being a sulfonic acid in the instance of an adsorbent employed on the hydrogen cycle and a sodium salt of the acid in the instance of an adsorbent used on the sodium cycle.

The reactions involved in the use of our exchange adsorbents may be represented as follows:

1. Na-cycle
 (a) $Z\!-\!SO_3H + Na^+ \rightarrow Z\!-\!SO_3Na + H^+$
  (COOH)
  (OH)
 (b) $2Z\!-\!SO_3Na + CaCl_2 \rightarrow (Z\!-\!SO_3)_2Ca + 2NaCl$
 (c) $(Z\!-\!SO_3)_2Ca + 2NaCl \rightarrow 2Z\!-\!SO_3Na + CaCl_2$
  (a) Conversion to Na cycle.
  (b) Exchange step.
  (c) Regeneration step.
2. H-cycle
 (a) $2Z\!-\!SO_3H + CaCl_2 \rightarrow (Z\!-\!SO_3)Ca + 2HCl$
 (b) $(Z\!-\!SO_3)_2Ca + 2HCl \rightarrow 2Z\!-\!SO_3H + CaCl_2$
  (a) Exchange step.
  (b) Regeneration step.

Z = insoluble organic residue to which functional groups are attached.

It is not, of course, to be taken from the foregoing equations that the adsorbents of the invention are limited to the removal of calcium ions as they are equally applicable to the removal of other cations, such as magnesium, copper, lead, iron, etc., from aqueous solutions. It is also to be understood that in lieu of forming the sodium salt of the sulfonic acid, we may form the corresponding potassium salt in which event potassium ions instead of sodium ions are exchanged for other cations such as those named.

In water treatment operations where it is desired to produce an electrolyte-free water comparable to distilled water, our unneutralized adsorbents may be employed on the hydrogen cycle in a two-stage process which comprises passing the effluent water, after cation exchange, into contact with an acid removal body, such as an amine resin.

The preparation of our cation exchange adsorbents and their suitability for use in exchange reactions in aqueous media is further illustrated by the following example which is not to be construed as in any way limiting the scope of the invention.

A spent alkylation acid containing from 10% to 20% by weight of hydrocarbon was obtained from a pilot plant operating on a feed consisting of isobutane and butylene. The spent acid was heated at a temperature which ranged from 290° F. to 340° F. for about 4 hours. Gelation occurred before the expiration of 3 hours and the gel subsequently became converted to a hard granular solid, the transformation from the gel state to the granular state requiring about 15 minutes. After the heating period was over, excess acid was removed by water washing and the product thoroughly dried by heating at a temperature of about 212° F. for 13 hours in an electric oven. Prior to the drying, a part of the product was neutralized with an aqueous solution of sodium bicarbonate to convert it to the "sodium" condition, excess sodium ions being removed by water washing. Both the neutralized and unneutralized products following the drying were of excellent physical structure from the standpoint of use as exchange adsorbents. When tested by the usual method to determine their water-softening properties (percolation of a synthetically-prepared hard water of known calcium ion concentration through a bed of the adsorbent), the unneutralized product showed an exchange capacity of 6.0 kgr./cu. ft. as $CaCO_3$, and the neutralized product an exchange capacity of nearly 10 kgr./cu. ft. as $CaCO_3$, both measurements being made on a wet basis. The effluent water in both cases was quite clear and the adsorbent remained hard with no tendency to soften. Regeneration of the adsorbents was easily accomplished by washing with 2% HCl and 5% NaCl, respectively, a minimum amount of water being required to remove excess regenerant.

While perhaps the most important use of our exchange adsorbents is in the softening and purification of hard water by the removal of calcium and magnesium ions therefrom, they may be used for various other purposes, for example, in sugar refining to remove inorganic salts from sugar solutions. They may also be used to remove metallic ions from industrial effluents, e. g., copper and other metals from brass mill pickling liquor waste, zinc from mine waters, or in the removal of calcium, iron, copper and lead from organic acids, glycerol, carbohydrates, wines, etc., and from other compounds and chemical agents or materials which must be essentially free from heavy metals. Our exchangers may, in addition, find application in the isolation, purification, and recovery of physiologically active materials. Thus, they may be utilized in the large scale production of arginine, histidine, and lysine, or in the concentration and isolation of nicotine and caffeine. The employment of organic cation adsorbents has also been suggested for the recovery of magnesium and other metals from sea water.

We claim:

1. A process for preparing a solid, water-insoluble cation exchange material which includes heating an acid liquor comprising sulfuric acid of a concentration of from 98% to 100% and at least 10 per cent of a sulfuric acid-soluble polymer of a normally gaseous olefin at a temperature between 250° F. and 350° F. until gelation of the acid liquor occurs and for a period of time thereafter sufficient to insure substantial completion of the reaction between the acid and the olefin polymer, freeing the resulting granular solid of excess acid, and thereafter drying it.

2. A process for preparing a solid, water-insoluble cation exchange material which includes heating an acid liquor comprising sulfuric acid of a concentration of from 98% to 100% and at least 10 per cent of a sulfuric acid-soluble polymer of a normally gaseous olefin at a temperature between 250° F. and 350° F. until gelation of the acid liquor occurs and for a period of time thereafter sufficient to insure substantial completion of the reaction between the acid and the olefin polymer, freeing the resulting granular solid of excess acid, neutralizing the granular solid with a weak alkali, and thereafter drying it.

3. A process for preparing a solid, water-insoluble cation exchange material, which comprises subjecting spent alkylation sulfuric acid containing a sulfuric acid-soluble olefin polymer to a temperature between 250° F. and 350° F. for a period sufficient to convert it to a granular solid, freeing the granular solid of excess acid, and thereafter drying it.

4. A process for preparing a solid, water-insoluble cation exchange material, which comprises subjecting spent alkylation sulfuric acid containing a sulfuric acid-soluble olefin polymer to a temperature between 250° F. and 350° F. for a period sufficient to convert it to a granular solid, freeing the granular solid of excess acid, neutralizing the granular solid, and thereafter drying it.

5. A process for preparing a solid, water-insoluble cation exchange material, which comprises heating sulfuric acid which has previously been used as a catalyst in the alkylation of isobutane with butylene and which contains at least 10% of sulfuric acid-soluble hydrocarbon polymer at a temperature between 300° F. and 350° F. until gelation occurs, and for a period of time thereafter sufficient to insure substantial completion of the reaction between the acid and the hydrocarbon, freeing the resulting granular solid of excess acid, and thereafter drying it.

6. A process for preparing a solid, water-insoluble cation exchange material, which comprises heating sulfuric acid which has previously been used as a catalyst in the alkylation of isobutane with butylene and which contains at least 10% of sulfuric acid-soluble hydrocarbon polymer at a temperature between 300° F. and 350° F. until gelation occurs, and for a period of time thereafter sufficient to produce a granular solid, washing the granular solid to remove excess acid, neutralizing the washed solid with a weak aqueous solution of sodium bicarbonate, and thereafter drying it.

7. A cation exchange adsorbent produced by the process of claim 1.

8. A cation exchange adsorbent produced by the process of claim 3.

STEPHEN J. MACUGA.
FRANK G. CIAPETTA.
RANDALL G. HEILIGMANN.

REFERENCES CITED

The following references are of record in the file of this patent:

UNITED STATES PATENTS

| Number | Name | Date |
| --- | --- | --- |
| 2,139,394 | Van Peski | Dec. 6, 1938 |
| 2,291,226 | Higgins | July 28, 1942 |

OTHER REFERENCES

Ellis, "Chem. of Synthetic Resins," vol. I, pp. 217–219; Reinhold (1935).